(12) United States Patent
Xia et al.

(10) Patent No.: US 11,824,167 B2
(45) Date of Patent: Nov. 21, 2023

(54) WOUND ELECTRODE ASSEMBLY, LITHIUM-ION SECONDARY BATTERY AND NEGATIVE ELECTRODE PLATE

(71) Applicant: Contemporary Amperex Technology Co., Limited, Ningde (CN)

(72) Inventors: Qing Xia, Ningde (CN); Jiang Liu, Ningde (CN); Guobao Wang, Ningde (CN); Xiaomei Liu, Ningde (CN); Yongshou Lin, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 347 days.

(21) Appl. No.: 17/345,077

(22) Filed: Jun. 11, 2021

(65) Prior Publication Data

US 2021/0305633 A1  Sep. 30, 2021

Related U.S. Application Data

(63) Continuation of application No. PCT/CN2019/073980, filed on Jan. 30, 2019.

(51) Int. Cl.
*H01M 10/0587* (2010.01)
*H01M 10/0525* (2010.01)
(Continued)

(52) U.S. Cl.
CPC ....... *H01M 10/0587* (2013.01); *H01M 4/366* (2013.01); *H01M 4/62* (2013.01);
(Continued)

(58) Field of Classification Search
None
See application file for complete search history.

(56) References Cited

U.S. PATENT DOCUMENTS

2018/0233301 A1* 8/2018 Kano .................... H01M 50/46

FOREIGN PATENT DOCUMENTS

| CN | 1579028 A | * | 2/2005 | ............ H01M 4/131 |
| CN | 103378347 A | | 10/2013 | |

(Continued)

OTHER PUBLICATIONS

The First Office Action for China Application No. 201811519433.2, dated Nov. 17, 2020, 9 pages.
(Continued)

*Primary Examiner* — Carlos Barcena
(74) *Attorney, Agent, or Firm* — East IP P.C.

(57) ABSTRACT

The present application discloses a wound electrode assembly, wherein the negative electrode plate thereof includes a negative electrode current collector and a negative active material layer which includes a negative active material disposed on two opposite surfaces of the negative electrode current collector; and the two negative active material layers respectively include active an material layer in an unpaired region and an active material layer in a paired region distributed successively in the length direction of the negative electrode plate, and two active material layers in the unpaired regions are arranged at both ends in the length direction of the negative electrode plate, and a first metallic lithium layer is disposed on the surface of one or both of the active material layers in the unpaired regions, so that to form a first lithium pre-intercalation compound in either or both of the active material layers in the unpaired regions.

11 Claims, 3 Drawing Sheets

(51) Int. Cl.
   *H01M 4/36*   (2006.01)
   *H01M 4/62*   (2006.01)
   *H01M 4/02*   (2006.01)

(52) U.S. Cl.
   CPC .. *H01M 10/0525* (2013.01); *H01M 2004/021* (2013.01); *H01M 2004/027* (2013.01)

(56) References Cited

FOREIGN PATENT DOCUMENTS

| CN | 205355186 U | 6/2016 | | |
|---|---|---|---|---|
| CN | 106128791 A | 11/2016 | | |
| CN | 205882096 U | 1/2017 | | |
| CN | 104781979 B | 3/2017 | | |
| CN | 206003898 U | 3/2017 | | |
| CN | 206250284 U | 6/2017 | | |
| CN | 107039633 A | 8/2017 | | |
| CN | 107171028 A | 9/2017 | | |
| CN | 207572477 U | 7/2018 | | |
| CN | 108417399 A | 8/2018 | | |
| JP | H01264176 A | 10/1989 | | |
| JP | 2000082498 A | 3/2000 | | |
| JP | 2012114161 A | 6/2012 | | |
| JP | 5084110 B2 | 11/2012 | | |
| JP | 2014165050 A | 9/2014 | | |
| KR | 20170030290 A | 3/2017 | | |
| WO | WO-2013038672 A1 * | 3/2013 | .......... | H01M 10/052 |

OTHER PUBLICATIONS

The Second Office Action for China Application No. 201811519433.2, dated Mar. 12, 2021, 11 pages.
The International search report for PCT Application No. PCT/CN2019/073980, dated Jun. 3, 2019, 12 pages.
The Communication pursuant to Article 94(3) EPC for European Application No. 19896730.9, dated Oct. 28, 2022, 4 pages.
The Second Office Action for Chinese Application No. 202110849220.1, dated Sep. 28, 2022, 39 pages.
The Second Office Action for Chinese Application No. 201811519433.2, dated Mar. 12, 2021,5 pages.
The First Office Action for Chinese Application No. 202110849220.1, dated Jun. 24, 2022,15 pages.
The extended European search report for EP Application No. 19896730.9, dated Dec. 9, 2021, 9 pages.

* cited by examiner

WOUND ELECTRODE ASSEMBLY, LITHIUM-ION SECONDARY BATTERY AND NEGATIVE ELECTRODE PLATE

CROSS-REFERENCE TO RELATED APPLICATION

This application is a continuation of International Application No. PCT/CN2019/073980, filed on Jan. 30, 2019, which claims priority to Chinese Patent Application No. 201811519433.2 filed on Dec. 12, 2018, both of which are incorporated herein by reference in its entirety.

TECHNICAL FIELD

The present application belongs to the field of battery technology, and in particular relates to a wound electrode assembly, a lithium-ion secondary battery, and a negative electrode plate.

BACKGROUND

Considering production efficiency and cost, most lithium-ion secondary batteries have a laminated setting of positive electrode plates, separators, and negative electrode plates and are wound to obtain a wound electrode assembly. In the wound electrode assembly that adopts continuous coating electrode plates (as shown in FIG. 1), at the beginning and end of the wound negative electrode plate, there is inevitably an unpaired region facing no positive electrode plate (hereafter referred to as "an unpaired region").

Theoretical research and practical application show that during the charge and discharge cycle process of the battery, a small amount of lithium ions extracted from the positive electrode are received by the unpaired region of the negative electrode; in addition, under the thermodynamic driving force of entropy increase, lithium migration occurs between the unpaired region and paired region (i.e. a region with a opposite positive electrode plate) of the lithium-intercalated negative electrode due to the difference in lithium concentration. The lithium ions migrated to the unpaired region are used for SEI (solid electrolyte interface) film consumption on the surface of the unpaired region, or are permanently stored in the unpaired region, and will no longer participate in the deintercalation reaction between the positive and negative electrodes and become "dead lithium", which will cause capacity loss and deteriorate the cycle performance and storage performance of the lithium-ion secondary battery, and the impact is more serious at high temperatures (above 40° C.)

SUMMARY

The embodiments of the present application provide a wound electrode assembly, a lithium-ion secondary battery and a negative electrode plate, aiming to reduce or eliminate the conversion of reversible active lithium to the "dead lithium" of the active material layer in the unpaired region, and to improve cycle performance and storage performance of the lithium-ion secondary battery.

The first aspect of the embodiments of the present application provides a wound electrode assembly for lithium-ion secondary battery. The negative electrode plate of the wound electrode assembly includes a negative electrode current collector and a negative active material layer disposed on two opposite surfaces of the negative electrode current collector, wherein the negative active material layer includes a negative active material; and the two negative active material layers respectively include an active material layer in an unpaired region and an active material layer in a paired region distributed successively in the length direction of the negative electrode plate, and two active material layers in the unpaired region are arranged at both ends in the length direction of the negative electrode plate, and a first metallic lithium layer is disposed on the surface of one or both of the two active material layers in the unpaired region, so that to form a first lithium pre-intercalation compound in either or both of the active material layers in the two unpaired region.

The second aspect of the embodiments of the present application provides a lithium-ion secondary battery including a wound electrode assembly. The negative electrode plate of the electrode assembly includes a negative electrode current collector and a negative active material layer disposed on two opposite surfaces of the negative electrode current collector, wherein the negative active material layer includes a negative active material; and the two negative active material layers respectively include active material layers in an unpaired region and the active material layers in a paired region distributed successively in the length direction of the negative electrode plate, and the two active material layers in the unpaired region are arranged at both ends in the length direction of the negative electrode plate, and either or both of the active material layers in the unpaired region contain a first lithium pre-intercalation compound.

The third aspect of the embodiments of the present application provides a negative electrode plate for lithium-ion secondary battery, wherein the negative electrode plate includes: a negative electrode current collector; a negative active material layer disposed on two opposite surfaces of the negative electrode current collector, wherein the two negative active material layers respectively include active material layers in an unpaired region and the active material layers in a paired region distributed successively in the length direction of the negative electrode plate, and the two active material layers in an unpaired region are arranged at both ends in the length direction of the negative electrode plate, and the negative active material layer includes a negative active material; and a metallic lithium layer including at least a first metallic lithium layer, wherein first metallic lithium layer is disposed on the surface of one or both of the active material layers in an unpaired region, so that either or both of the active material layers in an unpaired region form a first lithium pre-intercalation compound.

In the wound electrode assembly, lithium-ion secondary battery, and negative electrode plate provided by the embodiments of the present application, the first pre-intercalated lithium compound is formed in one or both of the active material layers in the unpaired regions, thereby reducing the thermodynamic driving force of lithium intercalation or lithium migration on the active material layer in the unpaired regions, effectively reducing or eliminating the conversion of the reversible active lithium from the positive electrode to the "dead lithium" in the active material layers in the unpaired regions, so it can effectively reduce the capacity loss of lithium-ion secondary battery during cycle and storage processes, and improve the cycle performance and storage performance of lithium-ion secondary batteries.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1:
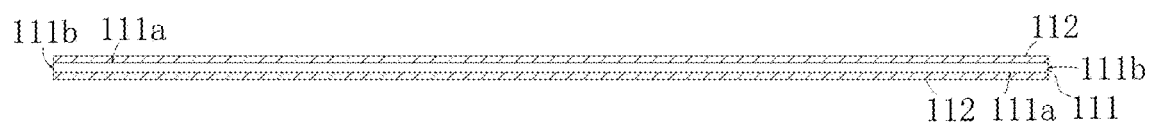
FIG. 1 is a schematic diagram of the structure of a continuous coating electrode plate.

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

First, the wound electrode assembly 10 according to the first aspect of the embodiment of the present application will be described with reference to FIGS. 2 to 5.

It should be noted that the wound electrode assembly 10 described in the first aspect of the embodiments of the present application is a bare electrode assembly, i.e., a structure that has not been infiltrated by an electrolyte. In a narrow sense, the wound electrode assembly 10 may only comprise a negative electrode plate 11, a positive electrode plate 12 and a separator 13.

The positive electrode plate 12 comprises a positive electrode current collector 121 and positive active material layers 122 disposed on two opposite surfaces of the positive electrode current collector 121, and the positive active material layer 122 comprises a positive active material. The negative electrode plate 11 comprises a negative electrode current collector 111 and negative active material layers 112 disposed on two opposite surfaces 111a of the negative electrode current collector 111, and the negative active material layer 112 comprises a negative active material. The wound electrode assembly 10 is formed by winding a positive electrode plate 12, a negative electrode plate 11 and a separator 13, and the separator film 13 functions as an isolation between the positive electrode plate 12 and the negative electrode plate 11.

Both the positive electrode plate 12 and the negative electrode plate 11 adopt a continuous coating structure. The structures of the continuously coated positive electrode plate 12 and the negative electrode plate 11 are similar. Taking the negative electrode plate 11 as an example for specific description, the negative electrode current collector 111 comprises two opposite end edges 111b along its own length, and both the negative active material layers 112 on the two surfaces 111a of the negative electrode current collector 111 extend from one end edge 111b of the negative electrode current collector 111 to the other end edge 111b.

The positive electrode plate 12, the separator 13 and the negative electrode plate 11 are stacked, and the wound electrode assembly 10 is obtained after winding. Since both the innermost and outermost circles of the wound electrode assembly 10 are the negative electrode plate 11, it is inevitable that on the side of the innermost circle of the negative electrode plate 11 facing the center of the wound electrode assembly 10, the active material layer 112 has an active material layer 1121 in an unpaired region facing no positive electrode plate 12; and on the side of the outermost circle of the negative electrode plate 11 facing away from the center of the wound electrode assembly 10, the negative active material layer 112 has an active material layer 1121 in an unpaired region facing no positive electrode plate 12.

In other words, the two negative active material layers 112 of the negative electrode plate 11 respectively comprise an active material layer 1121 in an unpaired region and the active material layers 1122 in a paired region distributed successively in the length direction of the negative electrode plate 11, and two active material layers 1121 in unpaired regions are arranged at both ends in the length direction of the negative electrode plate 11, that is to say, the two active material layers 1121 in the unpaired regions are arranged at the winding starting end and the winding ending end of the negative electrode plate 11.

Here, the "active material layer 1122 in the paired region" refers to the portion of the negative active material layer 112 excluding the active material layers 1121 in an unpaired region. It should also be noted that in order to ensure that the lithium ions released from the positive active material layer 122 during charging can be completely received by the negative active material layer 112 to avoid safety problems caused by the lithium evolution of the electrode assembly 10. Both the width direction and the length direction of the active material layer 1122 in the paired region are larger than those of the positive active material layer 112, so that the active material layer 1122 in the paired region has a certain elongation zone 112a (i.e., overhang) in the width direction and the length direction. Although the elongation zone 112a is not directly opposite to the positive active material layer 122, in this context, the elongation zone 112a is a part of the active material layer 1122 in the paired region, and does not belong to the active material layers 1121 in the unpaired region.

It can be understood that, in addition to the dimension in the length direction, the active material layer 1121 in the unpaired region and the active material layer 1122 in the paired region may be the same or different. Optionally, except for the dimension in the length direction, the active material layer 1121 in the unpaired region is same as the active material layer 1122 in the paired region, and the negative active material layer 112 can be prepared at one time, which is beneficial to improve production efficiency.

Further, a first metallic lithium layer 113 is disposed on the surface of one or both of the two active material layer 1121 in the unpaired region, so that either or both of the active material layers in an unpaired region form a first lithium pre-intercalation compound.

Figure 2:
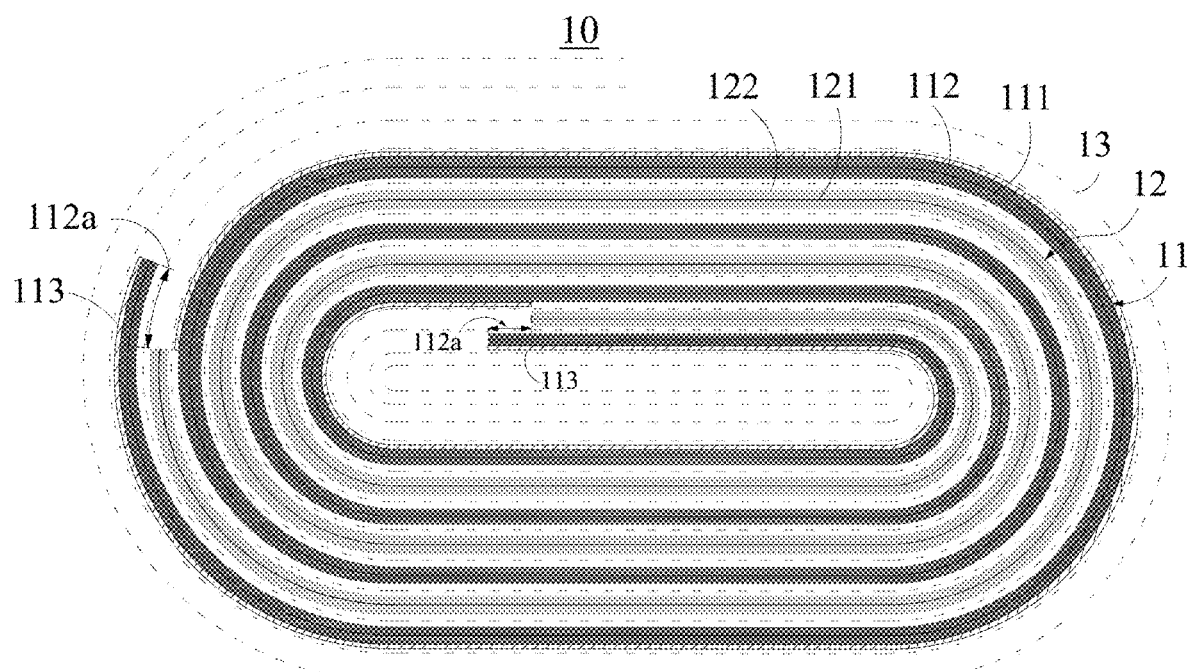
FIG. 2 is a schematic diagram of the structure of a wound electrode assembly according to an embodiment of the present application.
Figure 3:
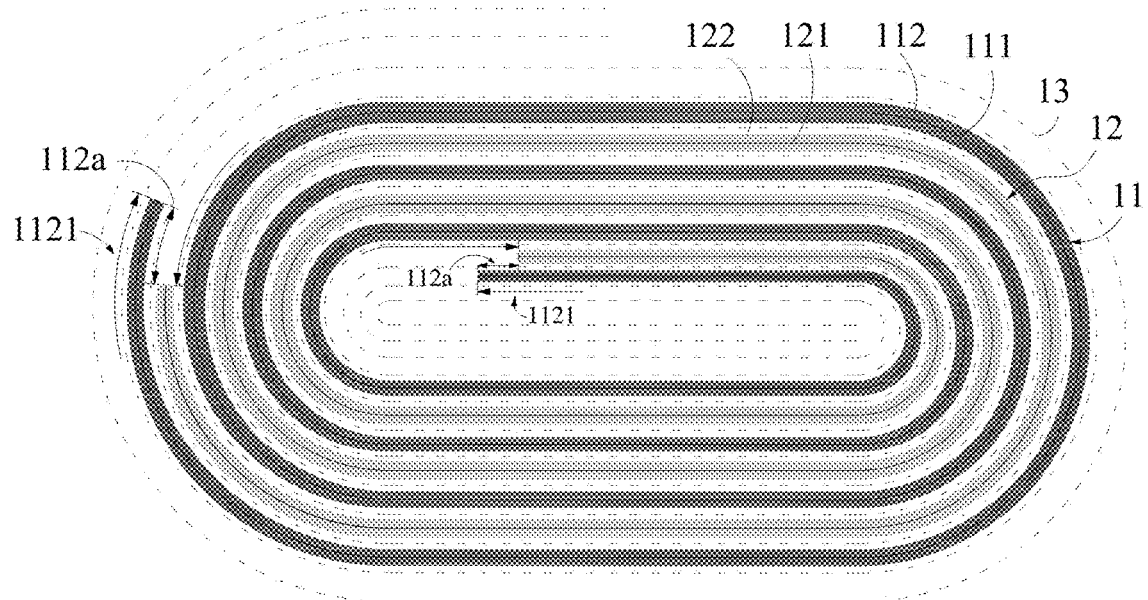
FIG. 3 is a schematic diagram of the structure of the wound electrode assembly of FIG. 2 without a first metallic lithium layer.
Figure 4:
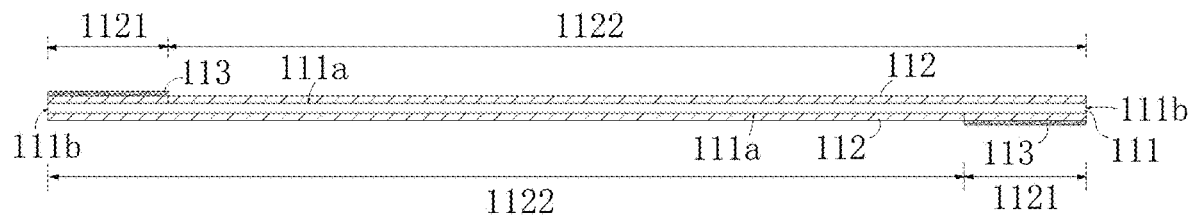
FIG. 4 is a schematic diagram of the structure of a negative electrode plate according to an embodiment of the application.

It can be understood that, as shown in FIG. 2 and FIG. 4, the first metallic lithium layer 113 is disposed on the two lone pair region active material layers 1121, so that the first metallic lithium layer 113 is formed on the two active material layers 1121 in the unpaired region, so as to form a first lithium pre-intercalation compound on the active material layers 1121 in the unpaired region.

It can also be understood that, the active material layer 1121 in the unpaired region having the first metallic lithium layer 113 of the negative electrode plate 11 may be immersed in the electrolyte, so that the first metallic lithium layer 113 will lithiate the negative active material of the active material layer 1121 in the unpaired region. The negative active material layer 1121 in the unpaired region forms a first lithium pre-intercalation compound, and then is assembled with the positive electrode 12 to obtain the wound electrode assembly 10 pre-intercalated with lithium, which can be further assembled to obtain a lithium-ion secondary battery.

It is also possible to assemble the negative electrode plate 11 with the first metallic lithium layer 113 and the positive electrode plate 12 to obtain the wound electrode assembly 10, and then the wound electrode assembly 10 is put into the casing 20 and the electrolyte is injected to obtain a lithium-ion secondary battery. Under the action of the electrolyte, the first metallic lithium layer 113 lithiates the negative active material of the active material layer 1121 in the unpaired region, and forms a first lithium pre-intercalation compound in the active material layer 1121 in the unpaired region. This method is simpler and easier to operate, and can achieve higher production efficiency.

In the present application, the first metallic lithium layer 113 is formed on one or both of the two active material layers 1121 in the unpaired region of the negative electrode plate 11 to form the first lithium pre-intercalation compound, thereby reducing the thermodynamic driving force of lithium intercalation or lithium migration on the active material layer 1121 in the unpaired region, effectively reducing or eliminating the conversion of the reversible active lithium from the positive electrode to the "dead lithium" in the active material layer 1121 in the unpaired region, so it can effectively reduce the capacity loss of lithium-ion secondary battery during cycle and storage and improve the cycle performance and storage performance of lithium-ion secondary batteries.

Therefore, the use of the wound electrode assembly 10 of the embodiment of the present application can enable the lithium-ion secondary battery to have higher cycle performance and storage performance, and it also has higher cycle performance and storage performance at high temperatures.

Further, as mentioned above, the active material layer 1121 in the unpaired region is inevitably present in the wound electrode assembly 10. Thus, the smaller the area proportion of the active material layer 1121 in the unpaired region in the negative active material layer 112 is, the higher the utilization rate of the negative active material that can be used for charging and discharging in the lithium-ion secondary battery will be, which is beneficial to improving the overall capacity of the battery. Therefore, in the present application, in each negative active material layer 112, the area of the active material layers 1122 in the paired region to the area of the active material layers 1121 in the unpaired region is from 99:1 to 4:1. Within this range, with the increasing of the area proportion of the active material layer 1121 in the unpaired region in the negative active material layer 112, by disposing the first pre-lithium intercalation compound in the active material layer 1121 in the unpaired region, the improvement on the consumption of "active lithium" would be more obvious, and the improvement on the cycle performance and storage performance of the lithium-ion secondary battery would be more effective.

Preferably, the first metallic lithium layer 113 is disposed on the surface of the active material layer 1121 in the unpaired region facing away from the negative electrode current collector 111. After the first lithium metal layer 113 lithiating the active material layer 1121 in the unpaired region, it can better ensure that the negative active material layer 112 and the negative electrode current collector 111 have a higher bonding force.

Preferably, the ratio of the weight of the first metallic lithium layer 113 per unit area to the weight of the active material layer 1121 in the unpaired region per unit area is from 0.5% to 10%, so as to ensure a suitable active lithium content of the active material layer 1121 in the unpaired region.

Further preferably, the first-cycle lithium intercalation capacity $C_1$ of the active material layer 1121 in the unpaired region per unit area and the capacity $C_2$ of the first metallic lithium layer 113 per unit area satisfy $C_1/(C_2 \times K_1) \geq 1.10$, wherein $K_1$ is the utilization rate of metallic lithium in the metallic lithium layer 113. Thus the negative active material of the active material layer 1121 in the unpaired region can provide enough vacancies to receive the intercalation of lithium ions from the first metallic lithium layer 113, improve the cycle performance and storage performance of lithium-ion secondary battery, and ensure that the lithium-ion secondary battery has high safety performance.

Among them, due to the oxidation of part of the metallic lithium in the first metallic lithium layer 113 and part of the lithium ions involved in the formation of the negative electrode, the utilization rate of the metallic lithium in the first metallic lithium layer 113 is usually less than 100%. According to research experience, the utilization rate of metallic lithium in the first metallic lithium layer 113 is generally from 75% to 85%, such as 78%-82%, or 80%. Of course, by reducing the oxidation of metallic lithium in the first metallic lithium layer 113 and reducing the participation of lithium ions from the first metallic lithium layer 113 in forming the negative electrode, the utilization rate can be improved.

Preferably, after the first lithium metal layer 113 lithiating the negative active material of the unpaired region active material layer 1121, a first lithium pre-intercalation compound is formed on the active material layer 1121 in the unpaired region, and the ratio of the active lithium content of the active material layer 1121 in the unpaired region to the gram capacity of the negative active material in the active material layer 1121 in the unpaired region is from 0.005 to 0.95. Keeping the ratio of the active lithium content of the active material layer 1121 in the unpaired region to the gram capacity of the negative active material in the active material layer 1121 in the unpaired region within the above range can reduce or eliminate the conversion of the reversible active lithium deinterlaced from the positive electrode to the "dead lithium" in the active material layer 1121 in the unpaired region, so it can effectively improve the cycle performance and storage performance of lithium-ion secondary batteries. In addition, it can also prevent lithium evolution or residual lithium from occurring in the active material layer 1121 in the unpaired region, thereby avoiding the gas generation problem caused by the precipitated lithium or lithium residual and ensuring that the lithium-ion secondary battery has high safety performance.

Further, the ratio of the active lithium content of the active material layer 1121 in the unpaired region to the gram capacity of the negative active material in the active material layer 1121 in the unpaired region is from 0.05 to 0.95. That is to say, after the lithium of the first metallic lithium layer 113 is used for the SEI film formation consumption on the surface of the active material layer 1121 in the unpaired region to compensate for the first charge and discharge efficiency, it still occupies a lot of vacancies in the active material layer 1121 in the unpaired region that can be intercalated with lithium. It can more effectively reduce or eliminate the conversion of reversible active lithium to the "dead lithium" of the active material layer 1121 in the unpaired region, and improve the cycle performance and storage performance of the lithium-ion secondary battery.

In the present application, the active lithium content of the active material layer 1121 in the unpaired region can be obtained by test method for a button half-cell. Specifically, the negative electrode plate 11 comprising the active material layer 1121 in the unpaired area is cut out, and after the active material layer 1122 in the paired region on the opposite side is removed, a test sample is obtained; the test sample and a lithium metal sheet are combined to form a button half-cell, then the button half-cell is charged at 0.1 C current and in voltage range of the button half-cell made of the corresponding active material of the full battery, to test the lithium deintercalation capacity of the active material layer 1121 in the unpaired region; then the above test sample is accurately weighed and deducted the weight of the negative electrode current collector 111 to calculate the mass of the negative active material according to the proportion of the negative active material in the coating slurry; the ratio of the lithium deintercalation capacity of the active material layer 1121 in the unpaired region of the tested button half-cell to the mass of the negative active material is the active lithium content of the active material layer 1121 in the unpaired region.

Further, the first-cycle lithium intercalation capacity C1' of the active material layer 1122 per unit area of the paired region and first-cycle lithium deintercalation capacity C3 per unit area of the positive active material layer 122 of the electrode assembly satisfy C1'/C3≥1.10. In this way, the negative active material of the active material layer 1122 in the paired region can provide enough vacancies to receive the intercalation of lithium ions extracted from the positive active material layer 122.

In some optional embodiments, a second metallic lithium layer 114 is further disposed on the surface of one or both of the active material layers 1122 in the two paired regions, so that a second lithium pre-intercalation compound 114 is formed on one or both of the active material layers 1122 in the two paired region. The second metallic lithium layer 114 lithiates the negative active material of the active material layer 1122 in the paired region, forming a second lithium pre-intercalation compound on the active material layer 1122 in the paired region, which can effectively compensate for the capacity loss caused by the participation of lithium ions released from the positive active material in the formation of negative electrode, improve the first-time efficiency, cycle performance and storage performance of the lithium-ion secondary battery, and ensure that the lithium-ion secondary battery has higher safety performance.

Figure 5:
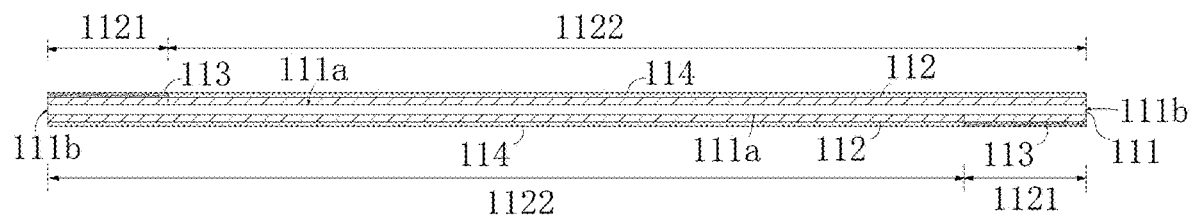
FIG. 5 is a schematic diagram of the structure of a negative electrode plate according to another embodiment of the application.

It can be understood that, as shown in FIG. 5, the second metallic lithium layer 114 is disposed on the active material layer 1122 in the two paired regions, so that the second lithium pre-intercalation compound is formed in the active material layers 1122 in the two paired regions. It is also possible to provide the second metallic lithium layer 114 only on the active material layer 1122 in any paired region, so that the second lithium pre-intercalation compound is formed on the active material layer 1122 in the paired region.

Preferably, the second metallic lithium layer 114 is disposed on the surface of the active material layer 1122 in the paired region facing away from the negative electrode current collector 111. After the second lithium metal layer 114 lithiating the active material layer 1122 in the paired region, it can better ensure that the negative active material layer 112 and the negative current collector 111 have a high bonding force.

The manner in which the second metallic lithium layer 114 lithiates the negative active material of the active material layer 1122 in the paired region can refer to the manner in which the first metallic lithium layer 113 lithiates the negative active material of the active material layer 1121 in the unpaired region.

Further, the first-cycle lithium intercalation capacity $C_1'$ of the active material layer 1122 in the paired region per unit area, the first-cycle lithium deintercalation capacity $C_3$ of the positive active material layer 122 of the electrode assembly per unit area, and the capacity $C_4$ of the second metallic lithium layer 114 per unit area satisfy $C_1'/(C_3+C_4 \times K_2) \geq 1.10$, where $K_2$ is the utilization rate of metallic lithium in the second metallic lithium layer 114. In this way, the negative active material of the active material layer 1122 in the paired region can provide enough vacancies to receive the intercalation of lithium ions from the second metallic lithium layer 114 and the positive active material layer 122.

Similarly, due to the oxidation of part of the metallic lithium in the second metallic lithium layer 114 and part of the lithium ions involved in the formation of the negative electrode, the utilization rate of the metallic lithium in the second metallic lithium layer 114 is usually less than 100%. According to research experience, the utilization rate of the metallic lithium in the second metallic lithium layer 114 is generally from 75% to 85%, such as 78%-82%, or 80%. Of course, by reducing the oxidation of metallic lithium in the second metallic lithium layer 114 and reducing the participation of lithium ions from the second metallic lithium layer 114 in forming the negative electrode, the utilization rate can be improved.

Preferably, the ratio of the weight of the second metallic lithium layer 114 per unit area to the weight of the active material layer 1122 in the paired region per unit area is from 0.5% to 10% to ensure a suitable active lithium content of the active material layer 1122 in the paired region.

In addition, the thickness of the second metallic lithium layer 114 and the first metallic lithium layer 113 can be the same or be different. The weight of the second metallic lithium layer 114 per unit area and the weight of the first metallic lithium layer 113 per unit area can be the same or be different. Preferably, the second metallic lithium layer 114 is the same as the first metallic lithium layer 113, thus a metallic lithium layer comprising the second metallic lithium layer 114 and the first metallic lithium layer 113 can be disposed on the surface of the negative active material layer 112 at one time, to make the operation simpler and thus to improve the production efficiency.

In the embodiments of the present application, the above-mentioned negative active material may be one or more of natural graphite, artificial graphite, soft carbon, hard carbon, mesophase carbon microspheres, nano carbon, carbon fiber, elemental silicon, silicon-oxygen compound, silicon-carbon composite, silicon alloy, elemental tin, tin-oxygen compound, tin-carbon composite, tin alloy, and lithium titanate. The above-mentioned silicon-oxygen compound refers to SiOx, in which x<2, such as silicon monoxide, etc. The silicon-carbon composite can be one or more of carbon-coated silicon, carbon-coated silicon-oxygen compound, a mixture of silicon and carbon, a mixture of silicon-oxygen compound and carbon, and a mixture of silicon and silicon-oxygen compound and carbon, in which the carbon can be one or more of natural graphite, artificial graphite, soft carbon, hard carbon, mesophase carbon microspheres, nano carbon and carbon fiber. The tin-oxygen compounds can be, for example, one or more of SnO and $SnO_2$. The tin-carbon composites can be one or more of carbon-coated tin, carbon-coated tin-oxygen compounds, a mixture of tin and carbon, a mixture of tin-oxygen compound and carbon, a mixture of tin and tin oxide compound and carbon, wherein the carbon can be one or more of natural graphite, artificial graphite, soft carbon, hard carbon, mesophase carbon microspheres, nano carbon and carbon fiber. The tin alloy can be, for example, one or more of Li—Sn alloy and Li—Sn—O alloy. The lithium titanate can be, for example, $Li_4Ti_5O_{12}$ with a spinel structure.

Preferably, the above-mentioned negative active material comprises a carbon-based negative active material, such as one or more of natural graphite, artificial graphite, soft carbon, hard carbon, mesophase carbon microspheres, nano carbon, and carbon fiber.

Further preferably, the above-mentioned negative active material comprises one or more of natural graphite and artificial graphite.

The negative active material layer 112 may further comprise a conductive agent and a binder. The present application does not specifically limit the types of conductive agents and binders in the negative active material layer 112, and can be selected according to actual needs. As an example, the conductive agent may be one or more of graphite, superconducting carbon, acetylene black, carbon black, Ketjen black, carbon dots, carbon nanotubes, graphene, and carbon nanofibers; the binder may be one or more of styrene rubber (SBR), polyvinylidene fluoride (PVDF), polytetrafluoroethylene (PTFE), polyvinyl butyral (PVB), water-dispersible acrylic resin, and carboxymethyl cellulose (CMC).

The negative active material layer 112 may further optionally comprise a thickener, such as carboxymethyl cellulose (CMC).

The negative electrode current collector 111 may use a metal foil or a porous metal plate, for example, a foil or a porous plate of metals such as copper, nickel, titanium, or iron, or their alloys, such as a copper foil.

In the embodiments of the present application, the above-mentioned positive active material may be selected from materials capable of intercalating and deintercalating lithium ions, for example, a lithium transition metal composite oxide, in which the transition metal can be one or more of Mn, Fe, Ni, Co, Cr, Ti, Zn, V, Al, Zr, Ce, and Mg. The lithium transition metal composite oxide may be one or more of, for example, $LiMn_2O_4$, $LiNiO_2$, $LiCoO_2$, $LiNi_{1-y}Co_yO_2$ (0<y<1), $LiNi_aCo_bAl_{1-a-b}O_2$ (0<a<1, 0<b<1, 0<a+b<1), $LiNi_mCo_nMn_{1-m-n}O_2$ (0<m<1, 0<n<1, 0<m+n<1), $LiMPO_4$ (M can be one or more of Fe, Mn, and Co) and $Li_3V_2(PO_4)_3$. The lithium transition metal composite oxide can also be doped with one or more of other transition metals, non-transition metals and non-metals.

The positive active material layer 122 may further comprise a conductive agent and a binder. The present application does not specifically limit the types of conductive agents and binders in the positive active material layer 122, and can be selected according to actual needs. As an example, the conductive agent may be one or more of graphite, superconducting carbon, acetylene black, carbon black, Ketjen black, carbon dots, carbon nanotubes, graphene, and carbon nanofibers; the binder may be one or more of styrene-butadiene rubber (SBR), water-dispersible acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorinated acrylic resin, and polyvinyl alcohol (PVA).

The positive electrode current collector 121 may be a metal foil or a porous metal plate, for example, a foil or a porous plate of metals such as aluminum, copper, nickel, titanium, or silver, or their alloys, such as an aluminum foil.

In the embodiments of the present application, there is no particular limitation on the separator, and any well-known porous separator having electrochemical stability and chemical stability can be selected, such as one or more of glass fiber, non-woven fabric, polyethylene, polypropylene and polyvinylidene fluoride. The separator can be a single-layer film or a multilayer composite film.

Next, a method for preparing the wound electrode assembly 10 provided in an embodiment of the present application will be described, and the above-mentioned wound electrode assembly 10 can be prepared by using such preparation method. The method includes the following steps: coating a positive electrode slurry on the two opposite surfaces of the positive electrode current collector 121, drying and cold pressing, to obtain the positive electrode plate 12; coating a negative electrode slurry on the two opposite surfaces 111*a* of the negative electrode current collector 111, drying and cold pressing, to obtain the negative active material layer 112, and then disposing the first metallic lithium layer 113 and the optional second metallic lithium layer 114 on the surface of the negative active material layer 112 facing away from the negative electrode current collector 111 to obtain the negative electrode plate 11; assembling the positive electrode plate 12, the separator 13 and the negative electrode plate 11 into a wound electrode assembly 10.

In the above preparation method, a rolling method can be used to stably fix the first metallic lithium layer 113 and the optional second metallic lithium layer 114 on the surface of the negative active material layer 112 with the intermolecular force between the lithium metal and the negative active material. The raw materials of the first metallic lithium layer 113 and the optional second metallic lithium layer 114 can be selected from one or more of lithium powder, lithium ingot, and lithium sheet.

Next, the lithium-ion secondary battery according to the second aspect of the embodiments of the present application will be described.

Figure 6:
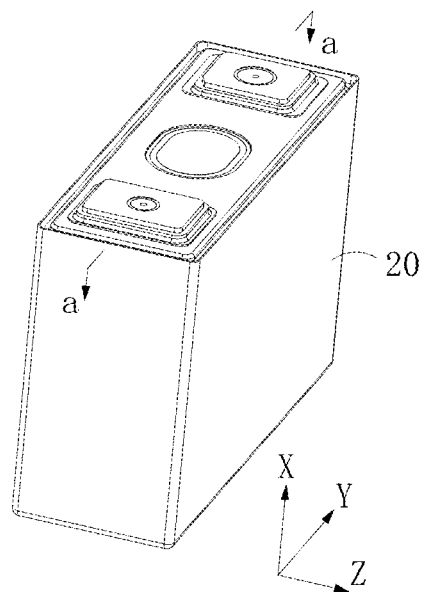
FIG. 6 is a schematic structural diagram of a lithium-ion secondary battery according to an embodiment of the application.
Figure 7:
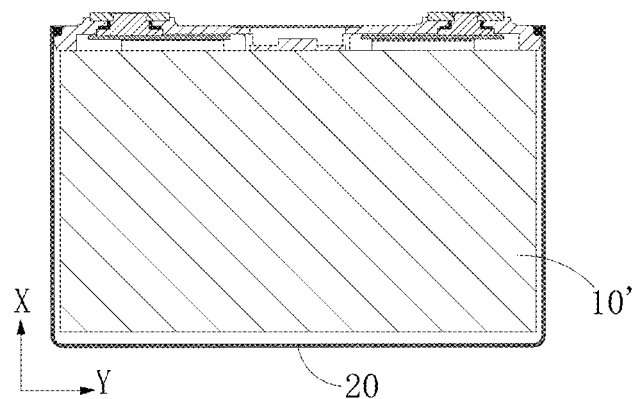
FIG. 7 is a cross-sectional view taken along a-a of FIG. 6

Please refer to FIGS. 6 and 7 together, a lithium-ion secondary battery provided by an embodiment of the present application comprises a wound electrode assembly 10, an electrolyte (not shown in the figure), and an outer casing 20 for encapsulating the wound electrode assembly 10 and the electrolyte.

The negative electrode plate 11 of the wound electrode assembly 10 comprises a negative electrode current collector 111 and negative e active material layers 112 disposed on two opposite surfaces 111a of the negative electrode current collector 111. The two negative active material layers 112 respectively comprise active material layers 1121 in an unpaired region and active material layers 1122 in a paired region distributed successively in the length direction of the negative electrode plate, and the active material layers 1121 in the two unpaired regions are arranged at both ends in the length direction of the negative electrode plate, and one or both of the active material layers in the two unpaired region comprises a first lithium pre-intercalation compound.

Specifically, the wound electrode assembly 10 with the first metallic lithium layer 113 according to the first aspect of the embodiments of the present application can be packed into the casing 20, and then an electrolyte can be injected. Under the action of the electrolyte, the first metallic lithium layer 113 lithiates the negative active material of the active material layer 1121 in the unpaired region, and forms a first lithium pre-intercalation compound on the active material layer 1121 in the unpaired region, thereby obtaining the lithium pre-intercalation wound electrode assembly 10.

It is also possible to further comprise a second lithium pre-intercalation compound in one or both of the two active material layers 1122 in the paired regions.

Specifically, the wound electrode assembly 10 having the first metallic lithium layer 113 and the second metallic lithium layer 114 according to the first aspect of the embodiments of the present application can be packed into the casing 20, and the electrolyte solution can be injected. Under the action of the electrolyte, the first metallic lithium layer 113 lithiates the negative active material of the active material layer 1121 in the unpaired region, forming a first lithium pre-intercalation compound in the active material layer 1121 in the unpaired region, and at the same time, the second metallic lithium layer 114 lithiates the negative active material of the active material layer 1122 in the paired region, forming the second lithium pre-intercalation compound in the active material layer 1122 in the paired region to obtain the lithium pre-intercalation wound electrode assembly 10.

Of course, it is also possible to pack the lithium pre-intercalation wound battery cell 10 in which the lithiation process is completed in advance into the outer casing 20 and to inject the electrolyte to obtain a lithium ion secondary battery.

In the present application, the first lithium pre-intercalation compound is formed in one or both of the active material layers 1121 in the two unpaired region of the negative electrode plate 11, which reduces the thermodynamic drive of lithium insertion or lithium migration of the active material layer 1121 in the unpaired region, effectively reducing or eliminating the conversion of the reversible active lithium from the positive electrode to the "dead lithium" in the active material layer 1121 in the unpaired region, so it can effectively reduce the capacity loss of lithium-ion secondary battery during cycle and storage and improve the cycle performance and storage performance of lithium-ion secondary batteries.

Therefore, the lithium-ion secondary battery of the present application has higher cycle performance and storage performance, and it also has higher cycle performance and storage performance at high temperatures.

Further, the ratio of the active lithium content of the active material layer 1121 in the unpaired region to the gram capacity of the negative active material in the active material layer 1121 in the unpaired region is from 0.005 to 0.95.

Further, the ratio of the active lithium content of the active material layer 1121 in the unpaired region to the gram capacity of the negative active material in the active material layer 1121 in the unpaired region is from 0.05 to 0.95.

In the embodiments of the present application, the electrolyte comprises a solvent and a lithium salt dissolved in the solvent, and the types of the solvent and the lithium salt are not specifically limited, and can be selected according to requirements.

As an example, the above-mentioned solvent may be a non-aqueous organic solvent, such as one or more, preferably two or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), methyl formate (MF), ethyl formate (Eft), methyl acetate (MA), ethyl acetate (EA), propyl acetate (PA), methyl propionate (MP), ethyl propionate (EP), propyl propionate (PP), methyl butyrate (MB), ethyl butyrate (EB), and propyl butyrate (BP).

As an example, the lithium salt may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate), such as one or more of $LiPF_6$ (lithium hexafluorophosphate), $LiBF_4$ (lithium tetrafluoroborate), LiBOB (lithium dioxalate borate), LiDFOB (lithium difluorooxalate borate), LiTFSI (lithium bistrifluoromethanesulfonimide), and LiTFSI (lithium bistrifluoromethanesulfonimide).

The electrolyte may also optionally comprise other additives, such as one or more of vinylene carbonate (VC), vinyl ethylene carbonate (VEC), fluoroethylene carbonate (FEC), difluoroethylene carbonate (DFEC), trifluoroproplylene carbonate (TFPC), succinonitrile (SN), adiponitrile (ADN), glutaronitrile (GLN), hexanetrinitrile (HTN), 1,3-propane sultone (1,3-PS), ethylene sulfate (DTD), methylene methanedisulfonate (MMDS), 1-propene-1,3-sultone (PST), 4-methylvinyl sulfate (PCS), 4-ethylvinyl sulfate (PES), 4-propylvinyl sulfate (PEGLST), propylene sulfate (TS), 1,4-butane sultone (1,4-BS), ethylene sulfite (DTO), dimethyl sulfite (DMS), diethyl sulfite (DES), sulfonate cyclic quaternary ammonium salt, tris(trimethylsilyl) phosphate (TMSP), and (trimethylsilyl) borate (TMSB), but not limited thereto.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios reported in the following examples are based on weight, and all reagents used in the examples are commercially available or synthesized according to conventional methods, and can be used directly without further processing, and the instruments used in the examples are all commercially available.

Example 1

Preparation of Positive Electrode Plate

Lithium iron phosphate LiFePO$_4$ as a positive active material, acetylene black as a conductive agent and PVDF as a binder were dispersed at a weight ratio of 94:4:2 into a solvent NMP and mixed uniformly to obtain a positive electrode slurry; the positive electrode slurry was uniformly coated on the two surfaces of an aluminum foil as a positive electrode current collector, wherein the single-sided coating weight of the positive electrode slurry on one side was 0.280 g/1540.25 mm$^2$, based on the weight without solvent. After drying and cold pressing, a positive electrode plate was obtained. The first lithium deintercalation capacity of LiFePO$_4$ was 160 mAh/g, and the gram capacity was 144 mAh/g.

Preparation of Negative Electrode Plate

Artificial graphite as a negative active material, acetylene black as a conductive agent, SBR as a binder and CMC as a thickener were dispersed at a weight ratio of 95:1.5:3.1:0.4 in a solvent deionized water and mixed uniformly to obtain a negative electrode slurry; the negative electrode slurry was uniformly coated on both surfaces of the copper foil as the negative electrode current collector, wherein the single-sided coating weight of the negative electrode slurry was 0.135 g/1540.25 mm$^2$ based on the weight without solvent; after drying and cold pressing, the negative active layer was obtained. On the surface of the active material layers in the two unpaired regions facing away from the negative electrode current collector, a first metallic lithium layer was respectively arranged by rolling to obtain the negative electrode plate. The first lithium intercalation capacity of artificial graphite was 365 mAh/g, and the gram capacity was 340 mAh/g; the weight of the first metallic lithium layer per unit area was 1.99 mg/1540.25 mm$^2$, and the gram capacity of metallic lithium was 3861.3 mAh/g; in each negative active material layer, the ratio of the area of the active material layer in the paired region to the area of the active material layer in the unpaired region was 89.5:10.5.

Preparation of Electrolyte

In an argon glove box with a water content of less than 10 ppm, EC, PC, and DMC were mixed at a weight ratio of EC:PC:DMC=3:3:3 to obtain a solvent, and then the fully dried lithium salt LiPF$_6$ was dissolved in the above solvent; after uniformly stirring, an electrolyte solution was obtained, in which the concentration of LiPF$_6$ was 1 mol/L.

Preparation of Lithium-Ion Secondary Battery

The positive electrode plate, the polyethylene porous separator and the negative electrode plate were arranged in sequence and wound into an electrode assembly. Then the electrode assembly was put into an outer casing, into which the electrolyte was then injected; after encapsulating the lithium-ion secondary battery was obtained.

The ratio of the weight of the first metallic lithium layer per unit area to the weight of the active material layer in the unpaired region per unit area=(1.99 mg/1540.25 mm$^2$)/(0.135 g/1540.25 mm$^2$)×100%=1.47%

$C_1/(C_2 \times K_1)$=(365mAh/g×0.135 g/1540.25 mm$^2$×95%)/(3861.3mAh/g×1.99 mg/1540.25 mm$^2$×80%)=7.62

Active lithium content of the active material layer in the unpaired region=18.4 mAh/g C.B.=$C_1'/C_3$=(365mAh/g×0.135 g/1540.25 mm$^2$×95%)/(160mAh/g×0.280 g/1540.25 mm$^2$×94%)=1.11

Example 2

Different from Example 1, the weight of the first metallic lithium layer per unit area was 4.71 mg/1540.25 mm$^2$.

The ratio of the weight of the first metallic lithium layer per unit area to the weight of the active material layer in the unpaired region per unit area=(4.71 mg/1540.25 mm$^2$)/(0.135 g/1540.25 mm$^2$)×100%=3.49%

$C_1/(C_2 \times K_1)$=(365mAh/g×0.135 g/1540.25 mm$^2$×95%)/(3861.3mAh/g×4.71 mg/1540.25 mm$^2$×80%)=3.22

Active lithium content of the active material layer in the unpaired region=92.8 mAh/g C.B.=$C_1'/C_3$=(365mAh/g×0.135 g/1540.25 mm$^2$×95%)/(160mAh/g×0.280 g/1540.25 mm$^2$×94%)=1.11

Example 3

Different from Example 1, the weight of the first metallic lithium layer per unit area was 9.24 mg/1540.25 mm$^2$.

The ratio of the weight of the first metallic lithium layer per unit area to the weight of the active material layer in the unpaired region per unit area=(9.24 mg/1540.25 mm$^2$)/(0.135 g/1540.25 mm$^2$)×100%=6.84%

$C_1/(C_2 \times K_1)$=(365mAh/g×0.135 g/1540.25 mm$^2$×95%)/(3861.3mAh/g×9.24 mg/1540.25 mm$^2$×80%)=1.64

Active lithium content of the active material layer in the unpaired region=202.5 mAh/g C.B.=$C_1'/C_3$=(365mAh/g×0.135 g/1540.25 mm$^2$×95%)/(160mAh/g×0.280 g/1540.25 mm$^2$×94%)=1.11

Example 4

Different from Example 1, the weight of the first metallic lithium layer per unit area was 12.95 mg/1540.25 mm 2.

The ratio of the weight of the first metallic lithium layer per unit area to the weight of the active material layer in the unpaired region per unit area=(12.95 mg/1540.25 mm$^2$)/(0.135 g/1540.25 mm$^2$)×100%=9.59%

$C_1/(C_2 \times K_1)$=(365mAh/g×0.135 g/1540.25 mm$^2$×95%)/(3861.3mAh/g×12.95 mg/1540.25 mm$^2$×80%)=1.17

Active lithium content of the active material layer in the unpaired region=308.9 mAh/g C.B.=$C_1'/C_3$=(365mAh/g×0.135 g/1540.25 mm$^2$×95%)/(160mAh/g×0.280 g/1540.25 mm$^2$×94%)=1.11

Example 5

Different from Example 1, the single-sided coating weight of the positive electrode slurry was 0.242 g/1540.25 mm$^2$; on the entire surface of the two negative active material layers facing away from the negative electrode current collector, the metallic lithium layer was formed by rolling, i.e. a first metallic lithium layer was disposed on the surface of the active material layers in the two unpaired regions, and a second metallic lithium layer was disposed on the surface of the active material layer in each of the two paired regions. The weight of the metallic lithium layer per unit area was 1.99 mg/1540.25 mm.

The ratio of the weight of the first metallic lithium layer per unit area to the weight of the active material layer in the unpaired region per unit area=(1.99 mg/1540.25 mm$^2$)/(0.135 g/1540.25 mm$^2$)×100%=1.47%

$$C_1/(C_2 \times K_1) = (365 mAh/g \times 0.135 \text{ g}/1540.25 \text{ mm}^2 \times 95\%)/(3861.3 mAh/g \times 1.99 \text{ mg}/1540.25 \text{ mm}^2 \times 80\%) = 7.62$$

Active lithium content of the active material layer in the unpaired region=18.8 mAh/g $$C.B. = C_1'/(C_3 + C_4 \times K_2) = (365 mAh/g \times 0.135 \text{ g}/1540.25 \text{ mm}^2 \times 95\%)/(160 mAh/g \times 0.242 \text{ g}/1540.25 \text{ mm}^2 \times 94\% + 3861.3 mAh/g \times 1.99 \text{ mg}/1540.25 \text{ mm}^2 \times 80\%) = 1.10$$

Example 6

Different from Example 5, the single-sided coating weight of the positive electrode slurry was 0.230 g/1540.25 mm$^2$, the single-sided coating weight of the negative electrode slurry was 0.162 g/1540.25 mm$^2$, and the weight of the metallic lithium layer per unit area was 5.18 mg/1540.25 mm$^2$.

The ratio of the weight of the first metallic lithium layer per unit area to the weight of the active material layer in the unpaired region per unit area=(5.18 mg/1540.25 mm$^2$)/(0.162 g/1540.25 mm$^2$)×100%=3.20%

$$C_1/(C_2 \times K_1) = (365 mAh/g \times 0.162 \text{ g}/1540.25 \text{ mm}2 \times 95\%)/(3861.3 mAh/g \times 5.18 \text{ mg}/1540.25 \text{ mm}^2 \times 80\%) = 3.51$$

Active lithium content of the active material layer in the unpaired region=86.1 mAh/g $$C.B. = C_1'/(C_3 + C_4 \times K_2) = (365 mAh/g \times 0.162 \text{ g}/1540.25 \text{ mm}^2 \times 95\%)/(160 \text{ mAh/g} \times 0.230 \text{ g}/1540.25 \text{ mm}^2 \times 94\% + 3861.3 mAh/g \times 5.18 \text{ mg}/1540.25 \text{ mm}^2 \times 80\%) = 1.11$$

Example 7

Preparation of Positive Electrode Plate

LiNi$_{0.8}$Co$_{0.1}$Mn$_{0.1}$ as a positive active material, acetylene black as a conductive agent and PVDF as a binder were dispersed at a weight ratio of 95.5:2.5:2 into a solvent NMP and mixed uniformly to obtain a positive electrode slurry; the positive electrode slurry was uniformly coated on the two surfaces of an aluminum foil as a positive electrode current collector, wherein the single-sided coating weight of the positive electrode slurry on one side was 0.279 g/1540.25 mm$^2$, based on the weight without solvent. After drying and cold pressing, a positive electrode plate was obtained. The first-cycle lithium deintercalation capacity of LiNi$_{0.8}$Co$_{0.1}$Mn$_{0.1}$ was 215 mAh/g, and the gram capacity was 190 mAh/g.

Preparation of Negative Electrode Plate

Silicon-carbon composite (a mixture of artificial graphite and SiO, and the mass ratio of artificial graphite to SiO is 8:2) as a negative active material, acetylene black as a conductive agent, SBR as a binder and CMC as a thickener were dispersed at a weight ratio of 94:2:3.5:0.5 in a solvent deionized water and mixed uniformly to obtain a negative electrode slurry; the negative electrode slurry was uniformly coated on both surfaces of the copper foil as the negative electrode current collector, wherein the single-sided coating weight of the negative electrode slurry was 0.125 g/1540.25 mm$^2$ based on the weight without solvent; after drying and cold pressing, the negative active layer was obtained; on the entire surface of the two negative active material layers facing away from the negative electrode current collector, a metallic lithium layer was formed by rolling, i.e. the first metallic lithium layer was disposed on the surface of the active material layers in the two unpaired regions, and a second metallic lithium layer was disposed on the surface of the active material layer in each of the two paired regions; thus a negative electrode plate was obtained. The first-cycle lithium intercalation capacity of silicon-carbon composite was 709 mAh/g, and the gram capacity was 568 mAh/g; the weight of the first metallic lithium layer per unit area was 5.74 mg/1540.25 mm$^2$, and the gram capacity of metallic lithium was 3861.3 mAh/g; in each negative active layer, the ratio of the area of the active material layer in the paired region to the area of the active material layer in the unpaired region was 75.5:24.5.

The preparation of the electrolyte and the lithium-ion secondary battery was the same as in Example 1.

The ratio of the weight of the first metallic lithium layer per unit area to the weight of the active material layer in the unpaired region per unit area=(5.74 mg/1540.25 mm$^2$)/(0.125 g/1540.25 mm$^2$)×100%=4.59%

$$C_1/(C_2 \times K_1) = (709 mAh/g \times 0.125 \text{ g}/1540.25 \text{ mm}^2 \times 94\%)/(3861.3 mAh/g \times 5.74 \text{ mg}/1540.25 \text{ mm}^2 \times 80\%) = 4.70$$

Active lithium content of the active material layer in the unpaired region=12.1 mAh/g $$C.B. = C_1'/(C_3 + C_4 \times K_2) = (709 mAh/g \times 0.125 \text{ g}/1540.25 \text{ mm}^2 \times 94\%)/(215 \text{ mAh/g} \times 0.279 \text{ g}/1540.25 \text{ mm}^2 \times 95.5\% + 3861.3 mAh/g \times 5.74 \text{ mg}/1540.25 \text{ mm}^2 \times 80\%) = 1.11$$

Comparative Example 1

Different from Example 1, the first metallic lithium layer was not disposed on the surface of the active material layer in the unpaired region of the negative electrode plate, and the second metallic lithium layer was not disposed on the surface of the active material layer in the paired region.

Active lithium content of the active material layer in the unpaired region=0.01 mAh/g $$C.B. = C_1'/C_3 = (365 mAh/g \times 0.135 \text{ g}/1540.25 \text{ mm}^2 \times 95\%)/(160 mAh/g \times 0.280 \text{ g}/1540.25 \text{ mm}^2 \times 94\%) = 1.11$$

Comparative Example 2

Different from Example 5, the first metallic lithium layer was not disposed on the surface of the active material layers in the two unpaired regions of the negative electrode plate, and the second metallic lithium layer was respectively disposed on the surface of the active material layer in the two paired regions.

Active lithium content of the active material layer in the unpaired region=0.03 mAh/g $C.B.=C_1'/(C_3+C_4\times K_2)=(365\text{mAh/g}\times 0.135\text{ g}/1540.25\text{ mm}^2\times 95\%)/(160\text{mAh/g}\times 0.242\text{ g}/1540.25\text{ mm}^2\times 94\%+3861.3\text{mAh/g}\times 1.99\text{ mg}/1540.25\text{ mm}^2\times 80\%)=1.10$

Comparative Example 3

Different from Example 6, the first metallic lithium layer was not disposed on the surface of the active material layer in the two unpaired regions of the negative electrode plate, and the second metallic lithium layer was respectively disposed on the surface of the active material layer in the two paired regions.

Active lithium content in the unpaired region=0.01 mAh/g $C.B.=C_1'/(C_3+C_4\times K_2)=(365\text{mAh/g}\times 0.162\text{ g}/1540.25\text{ mm}^2\times 95\%)/(160\text{ mAh/g}\times 0.230\text{ g}/1540.25\text{ mm}^2\times 94\%+3861.3\text{mAh/g}\times 5.18\text{ mg}/1540.25\text{ mm}^2\times 80\%)=1.11$

Comparative Example 4

Different from Example 7, the first metallic lithium layer was not disposed on the surface of the active material layer in the two unpaired regions of the negative electrode plate, and the second metallic lithium layer was respectively disposed on the surface of the active material layer in the two paired regions.

Active lithium content of the active material layer in the unpaired region=0.04 mAh/g $C.B.=C_1'/(C_3+C_4\times K_2)=(709\text{mAh/g}\times 0.125\text{ g}/1540.25\text{ mm}^2\times 94\%)/(215\text{mAh/g}\times 0.279\text{ g}/1540.25\text{ mm}^2\times 95.5\%+3861.3\text{mAh/g}\times 5.74\text{ mg}/1540.25\text{ mm}^2\times 80\%)=1.11$ Test Part (1) Test for the Active Lithium Content of the Active Material Layer in the Unpaired Region The negative electrode plate comprising the active material layer in the unpaired region was cut out, and the active material layer of the opposite region on the opposite side was removed to obtain a test sample. The test sample and the lithium metal sheet were combined to form a button half-cell, which was charged at the voltage range of the button half-cell made of the corresponding active material of the full battery at a current of 0.1 C to test the lithium deintercalation capacity of the active material layer in the unpaired area; then the above test sample was accurately weighed and deducted the weight of the negative electrode current collector to calculate the mass of the negative active material according to the proportion of the negative active material in the coating slurry; the ratio of the lithium deintercalation capacity of the active material layer in the unpaired region of the tested button half-cell to the mass of the negative active material was the active lithium content Q of the active material layer in the unpaired region.

(2) Test for High-Temperature Cycle Performance of Lithium-Ion Secondary Battery At 60° C., the lithium-ion secondary battery was charged to 3.65 V (for Example 7 and Comparative Example 4, charged to 4.2 V at a constant current) at a constant current of 1 C (i.e., the current value at which the theoretical capacity was completely discharged within 1 h), then charge at a constant voltage to a current of 0.05 C, then left aside for 5 minutes, and then discharged at a constant current of 1 C to 2.5 V (for Example 7 and Comparative Example 4, discharged at a constant current to 2.8 V). This procedure was a charge and discharge cycle, and the discharge capacity at this time was recorded as the discharge capacity at the first cycle of the lithium-ion secondary battery. The lithium-ion secondary battery was subjected to 1000 cycles of charge and discharge according to the above method, and the discharge capacity at the $1000^{th}$ cycle was recorded.

The capacity retention rate (%) of a lithium-ion secondary battery after 1000 cycles of 1 C/1 C at 60° C.=discharge capacity after the $1000^{th}$ cycle/discharge capacity after the $1^{st}$ cycle×100%.

(3) Test for High-Temperature Storage Performance of Lithium-Ion Secondary Battery At 25° C., the lithium ion secondary battery was charged to 3.65 V (for Example 7 and Comparative Example 4, charged to 4.2 V at a constant current) at a constant current of 0.5 C (i.e., the current value at which the theoretical capacity was completely discharged within 2 h), then charged at a constant voltage to a current of 0.05 C, then left aside for 5 minutes, and then discharged at a constant current of 0.5 C to 2.5 V (for Example 7 and Comparative Example 4, discharged at a constant current to 2.8 V), then the discharge capacity at this time was recorded as the initial reversible capacity of the lithium-ion secondary battery; then the battery was fully charged at a constant current of 0.5 C, and the fully-charged lithium-ion secondary battery was stored at 60° C. for 150 days.

After the high-temperature storage was completed, the lithium-ion secondary battery was took out, cooled naturally to 25° C., and discharged to 2.5 V (for Example 7 and Comparative Example 4, discharged to 2.8 V at a constant current) at a constant current of 0.5 C, and left aside for 5 minutes, then charged at a constant current of 0.5 C to 3.65 V (for Example 7 and Comparative Example 4, charged at a constant current to 4.2 V), then charged at a constant voltage to a current of 0.05 C, then left aside for 5 minutes, and then discharged at a constant current of 0.5 C to 2.5 V (for Example 7 and Comparative Example 4, discharged at a constant current to 2.8 V), the discharge capacity at this time was recorded as the reversible capacity of the lithium-ion secondary battery after high-temperature storage for 150 days.

The capacity retention rate (%) of a lithium-ion secondary battery after high temperature storage at 60° C. for 150 days=reversible capacity after high temperature storage for 150 days/initial reversible capacity×100%.

The test results of Examples 1 to 7 and Comparative Examples 1 to 4 were shown in Table 1.

TABLE 1

| | The weight of the first metallic lithium layer per unit area mg/1540.25 mm² | W % | Q mAh/g | $Q/Q_{cpg}$ | $C_1/(C_2 \times K_1)$ | C.B. | Capacity retention rate (%) after 1000 cycles at 60° C. 1C/1C | Capacity retention rate (%) after storage at 60° C. for 150 days |
|---|---|---|---|---|---|---|---|---|
| Example 1 | 1.99 | 1.47 | 18.4 | 0.054 | 7.62 | 1.11 | 82.1 | 85.4 |
| Example 2 | 4.71 | 3.49 | 92.8 | 0.273 | 3.22 | 1.11 | 82.9 | 85.8 |
| Example 3 | 9.24 | 6.84 | 202.5 | 0.596 | 1.64 | 1.11 | 83.4 | 86.1 |
| Example 4 | 12.95 | 9.59 | 308.9 | 0.909 | 1.17 | 1.11 | 84.1 | 86.3 |
| Example 5 | 1.99 | 1.47 | 18.8 | 0.055 | 7.62 | 1.10 | 97.1 | 97.9 |
| Example 6 | 5.18 | 3.20 | 86.1 | 0.253 | 3.51 | 1.11 | 100.5 | 100.9 |
| Example 7 | 5.74 | 4.59 | 12.1 | 0.021 | 4.70 | 1.11 | 84.9 | 93.7 |
| Comparative Example 1 | 0 | 0 | 0.01 | $3 \times 10^{-5}$ | — | 1.11 | 80.2 | 84.3 |
| Comparative Example 2 | 0 | 0 | 0.03 | $9 \times 10^{-5}$ | — | 1.10 | 96.2 | 97.3 |
| Comparative Example 3 | 0 | 0 | 0.01 | $3 \times 10^{-5}$ | — | 1.11 | 99.5 | 99.9 |
| Comparative Example 4 | 0 | 0 | 0.04 | $7 \times 10^{-5}$ | — | 1.11 | 83.2 | 92.6 |

In Table 1, W referred to the ratio of the weight W113 of the first metallic lithium layer per unit area to the weight W1121 of the active material layer in the unpaired region per unit area, W=W113/W1121×100%; $Q/Q_{cpg}$ referred to the ratio of the active lithium content Q of the active material layer in the unpaired region to the gram capacity $Q_{cpg}$ of the negative active material in the active material layer of the unpaired region.

Comparing and analyzing Examples 1-4 and Comparative Example 1, it can be seen that by arranging the first metallic lithium layer in the unpaired regions at the winding starting end and the winding ending end of the negative electrode plate in the wound electrode assembly, the first lithium pre-intercalation compound was formed after the injection of electrolyte, which can effectively improve the cycle and storage life of lithium-ion secondary batteries. In addition, as the weight of the first metallic lithium layer increased within a certain range, the improvement of the cycle and storage life of the lithium-ion secondary battery also increased.

It can be found from Example 5 and Comparative Example 2 and Example 6 and Comparative Example 3 that, in Comparative Example 2 and Comparative Example 3, the metallic lithium layer was only disposed in the paired region, although to a certain extent, it can compensate for the consumption of lithium ions during the first charge and discharge and the subsequent cycle process, during the battery charge-discharge cycle, the lithium ions extracted from the positive electrode were received by the active material layer in the unpaired region, and lithium migration was formed due to the difference in lithium concentration between the active material layer in the unpaired region and the active material layer in the paired region of the lithium-inserted negative electrode. Thus, the lithium ions that migrated to the active material layer in the unpaired pair were used for SEI film formation on the surface of the active material layer in the unpaired region, or are permanently stored in the active material layer in the unpaired region, which can no longer participate in the deintercalation reaction between the positive and negative electrodes and became "dead lithium", causing capacity loss and deteriorating the cycle performance and storage performance of the lithium-ion secondary battery. The above-mentioned problems can be effectively improved by forming the first lithium pre-intercalation compound in the unpaired region, so that the cycle performance and storage performance of the lithium ion secondary battery were further improved.

Example 7 and Comparative Example 4 were specific implementation in which the negative active material was a silicon-carbon composite material, belonging to the application of the method according to the present application in the lithiated electrode assembly. It was also confirmed that the presence of first lithium pre-intercalation compounds in the active material layer in the unpaired region had a significant improvement effect on the cycle performance and storage performance of lithium ion secondary batteries.

In summary, by arranging the first metallic lithium layer in the unpaired regions at the winding starting end and the winding ending end of the negative electrode plate in the wound electrode assembly, the first lithium pre-intercalation compound was formed after the injection of electrolyte, which can reduce the thermodynamic drive of lithium insertion or lithium migration of the active material layer in the unpaired region, effectively reducing or eliminating the conversion of the reversible active lithium from the positive electrode to the "dead lithium" in the active material layer in the unpaired region, so that the lithium-ion secondary battery can simultaneously have both high storage performance and cycle performance, and it can also have both high storage performance and cycle performance at high temperatures. Therefore, this application provides a simple and efficient improvement idea and process for the design of long-life lithium-ion secondary batteries.

It should be noted that although the embodiments have been described above, the scope of patent protection of the present application is not limited thereto. Therefore, based on the innovation idea of the present application, any alterations and modifications made to the embodiments of the present application, or equivalent structures or equivalent flow transformations made by means of the description and accompanying drawings of the present application, directly or indirectly use the above technical solutions to other related technical fields, and shall fall within the scope of patent protection of the present application.

What is claimed is:

1. A wound electrode assembly for lithium-ion secondary battery, wherein the wound electrode assembly comprises a negative electrode plate comprising a negative electrode current collector and negative active material layers disposed on two opposite surfaces of the negative electrode current collector, and the negative active material layer comprises a negative active material; and wherein the two negative active material layers respectively comprise an active material layer in an unpaired region facing no positive electrode plate and an active material layer in a paired region distributed successively in the length direction of the negative electrode plate, wherein the paired region has an opposite positive electrode plate, and two active material layers in the unpaired regions are arranged at both ends in the length direction of the negative electrode plate, and a first metallic lithium layer is disposed on the surface of one or both of the two active material layers in the unpaired regions, so that to form a first lithium pre-intercalation compound in either or both of the active material layers in the two unpaired regions; and characterized in that, in each of the negative active material layers, the ratio of the area of the active material layer in the paired region to the area of the active material layer in the unpaired region is from 99:1 to 4:1.

2. The wound electrode assembly according to claim 1, wherein the first metallic lithium layer is disposed on a surface of the active material layer in the unpaired region that faces away from the negative electrode current collector.

3. The wound electrode assembly according to claim 1, wherein a ratio of a weight of the first metallic lithium layer per unit area to a weight of the active material layer in the unpaired region per unit area is from 0.5% to 10%.

4. The wound electrode assembly according to claim 1, wherein a second metallic lithium layer is further disposed on the surface of one or both of the active material layers in the paired region, so as to form a second lithium pre-intercalation compound in either or both of the two paired active material layer regions.

5. The wound electrode assembly according to claim 4, wherein a ratio of a weight of the second metallic lithium layer per unit area to a weight of the active material layer in the paired regions per unit area is from 0.5% to 10%.

6. The wound electrode assembly according to claim 1, wherein the negative active material is one or more of natural graphite, artificial graphite, soft carbon, hard carbon, mesophase carbon microspheres, nano-carbon, carbon fiber, elemental silicon, silicon-oxygen compound, silicon-carbon composite, silicon alloy, elemental tin, tin-oxygen compound, tin-carbon composite, tin alloy and lithium titanate.

7. The wound electrode assembly according to claim 1, wherein the negative active material comprises a carbon-based negative active material.

8. The wound electrode assembly according to claim 1, wherein the negative active material comprises one or more of natural graphite and artificial graphite.

9. A lithium ion secondary battery comprising a wound electrode assembly according to claim 1.

10. The lithium ion secondary battery according to claim 9, wherein the active material layer in the unpaired region comprises a first lithium pre-intercalation compound, and a ratio of a active lithium content of the active material layer in the unpaired region to a gram capacity of the negative active material in the active material layer in the unpaired region is from 0.005 to 0.95.

11. A negative electrode plate for lithium-ion secondary battery, characterized in that, the negative electrode plate is as defined in claim 1.

* * * * *